Patented Oct. 22, 1935

2,018,410

UNITED STATES PATENT OFFICE 2,018,410

DENTIFRICE PREPARATION

Guy A. McDonald and Dariel Miller, Chicago Heights, Ill., assignors to Victor Chemical Works, a corporation of Illinois No Drawing. Application December 11, 1933, Serial No. 701,944

11 Claims. (Cl. 167—93)

This invention relates to an improved dentifrice and to a dental abrasive agent for use in toothpastes and powders, and particularly to a dicalcium phosphate composition which will not harden or become gritty with age.

Dicalcium phosphate is a well-known abrasive agent in the preparation of dentifrices. In such connection it has been used in the hydrated and partially dehydrated as well as the anhydrous state. The hydrated dicalcium phosphate is particularly advantageous for use in tooth pastes containing glycerine, because it has a lower glycerine absorbing capacity. By the use of this form of dicalcium phosphate it is possible to use approximately 20–30% less glycerine in the dentifrice. The hydrated form of dicalcium phosphate, however, has heretofore had the very undesirable property of becoming gritty on aging and developing soft, irregular lumps surrounded by a watery layer of paste. These changes rendered the dentifrices undesirable for use, and relatively unsalable.

It has now been discovered that a hydrated dicalcium phosphate may be stabilized against this production of grit, or lumping, for indefinite periods by freeing the dicalcium phosphate substantially completely from monocalcium phosphate, and by the addition of a stabilizing agent in small amounts. The preferred form of stabilizing agent is trimagnesium phosphate, but other magnesium salts, such as magnesium sulfate, stearate or dimagnesium phosphate may likewise be used.

In accordance with the present invention a substantially monocalcium phosphate-free hydrated dicalcium phosphate is prepared, preferably in powdered form, and a stabilizing agent is mixed with it in finely powdered condition in amounts ranging preferably from ½ to 4% by weight of the dicalcium phosphate.

As an example of the invention a typical dicalcium phosphate dihydrate having the following composition was used:

| | Percent |
|---|---|
| $CaHPO_4.2H_2O$ | 96.78 |
| $CaHPO_4$ | 0.80 |
| $Ca_3P_2O_8.H_2O$ | 0.78 |
| $Ca(H_2PO_4)_2.H_2O$ | Trace |
| Fe and $AlPO_4$ | 0.62 |
| $CaCO_3$ | 0.75 |
| Etc. | 0.27 |
| | 100.00 |

This product, in powdered form, was mixed with ½ to 4% of tri-magnesium phosphate, likewise in powdered condition, and the resulting mixture was then made up into a dentifrice. A dentifrice composition may be prepared from abrasive material in any desired proportions.

A preferred range of proportions is as follows:

| | Percent |
|---|---|
| Dicalcium phosphate dihydrate | 45–55 |
| Stabilizing agent | 1– 4 |
| Glycerine | 25–35 |
| Gum | 1– 3 |
| Flavor | 0– 1 |
| Water | Balance |

A specific formula contained 50 parts of the abrasive agent (including the stabilizing agent), 30 parts of glycerine, 18 parts of water, 1 part of gum tragacanth and 1 part of flavor.

A dentifrice prepared according to this formula and containing 2% of tri-magnesium phosphate based upon the weight of dicalcium phosphate dihydrate, when maintained at 60° C. in an oven was still good at the end of 2400 hours, whereas without the tri-magnesium phosphate the dentifrice became gritty in 62–88 hours.

Dentifrice compositions were also tested after oven treatment at 60° C. to determine the percentage of dehydration of the dicalcium phosphate dihydrate. It was found that after 62–88 hours, the dicalcium phosphate without stabilizer showed 78% of dehydration. With the addition of 1% of tri-magnesium phosphate the dehydration was 6.5% at the end of 1440 hours, whereas with 2% of tri-magnesium phosphate the dehydration was only 0.65% at the end of 2400 hours. With dimagnesium phosphate or magnesium stearate it is necessary to use 2 to 4% of the salt to obtain effective stabilization, whereas even higher amounts of magnesium sulfate are required. With 2% of magnesium sulphate the dentifrice became gritty at the end of 240 hours and with 2% of di-magnesium phosphate it became hard at 432 hours. With 2% of magnesium stearate the dentifrice was lumpy at the end of 684 hours. All these figures refer to accelerated aging tests made at 60° C. in an oven.

The dicalcium phosphate dihydrate may likewise be used, when mixed with a small amount of stabilizing material, directly as a tooth powder. When in the powder form, aging tests at 45° C. show 58% dehydration at the end of 21 days where no stabilizing agent is used, whereas with 1% tri-magnesium phosphate the dehydration was only 21%.

The commercial dicalcium phosphate dihydrate is generally partially dehydrated in storage, before use in the abrasive. Thus dehydration may be as high as 7-10% or more, but in carrying out the invention may be disregarded.

The foregoing detailed description has been given for clearness of understanding only, and no unnecessary limitations should be understood therefrom, but the appended claims should be construed as broadly as permissible, in view of the prior art.

What we claim as new and desire to secure by Letters Patent is:

1. An abrasive composition comprising comminuted dicalcium phosphate dihydrate and a small proportion of a stabilizing agent, of the class consisting of magnesium phosphates, magnesium stearate and magnesium sulfate.

2. An abrasive composition comprising comminuted dicalcium phosphate dihydrate and a small proportion of tri-magnesium phosphate.

3. An abrasive composition as set forth in claim 1, in which the proportion of stabilizing agent is ¼ to 4%.

4. An abrasive composition comprising monocalcium phosphate-free dicalcium phosphate dihydrate, and ½ to 2% of trimagnesium phosphate.

5. An abrasive composition comprising monocalcium phosphate-free dicalcium phosphate dihydrate, and 2 to 4% of magnesium stearate.

6. A dentifrice composition comprising substantially monocalcium phosphate-free dicalcium phosphate dihydrate, glycerine, water, gum, flavor, and a small proportion of a dicalcium phosphate dihydrate stabilizing agent, of the class consisting of magnesium phosphate, magnesium stearate and magnesium sulfate.

7. A composition as set forth in claim 6, in which the stabilizing agent is tri-magnesium phosphate.

8. A composition as set forth in claim 6, in which the stabilizing agent is magnesium stearate.

9. A tooth paste composition having the following composition:

| | |
|---|---|
| Dicalcium phosphate dihydrate | 45-55% |
| Trimagnesium phosphate | 1- 4% |
| Glycerine | 25-35% |
| Gum | 1- 3% |
| Flavor | 0- 1% |
| Water | Balance |

10. A tooth paste composition having the following composition:

| | |
|---|---|
| Dicalcium phosphate dihydrate | 45-55% |
| Magnesium stearate | 1- 4% |
| Glycerine | 25-35% |
| Gum | 1- 3% |
| Flavor | 0- 1% |
| Water | Balance |

11. An abrasive composition as set forth in claim 1, in which the stabilizing agent is dimagnesium phosphate.

GUY A. McDONALD.
DARIEL MILLER.